US00RE47893E

(19) United States
(12) Reissued Patent
Chavan et al.

(10) Patent Number: US RE47,893 E
(45) **Date of Reissued Patent: *Mar. 3, 2020**

(54) CONDUIT CONNECTOR AND METHODS FOR MAKING AND USING THE SAME

(71) Applicant: Sigma Electric Manufacturing Corporation, Garner, NC (US)

(72) Inventors: Vinayak Manohar Chavan, Pune (IN); Yuvraj Totaram Khodape, Pune (IN); Ashok Alilughatta Sathanarayana, Pune (IN)

(73) Assignee: SIGMA ELECTRIC MANUFACTURING CORPORATION, Garner, NC (US)

( * ) Notice: This patent is subject to a terminal disclaimer.

(21) Appl. No.: 15/234,619

(22) Filed: Aug. 11, 2016

Related U.S. Patent Documents

Reissue of:
(64) Patent No.: 8,803,008
Issued: Aug. 12, 2014
Appl. No.: 13/409,409
Filed: Mar. 1, 2012

U.S. Applications:
(60) Provisional application No. 61/448,872, filed on Mar. 3, 2011.

(51) Int. Cl.
*H02G 3/04* (2006.01)
*H02G 3/06* (2006.01)
(Continued)

(52) U.S. Cl.
CPC ..... *H02G 3/0616* (2013.01); *H02G 3/0691* (2013.01); *H01R 13/74* (2013.01); *H02G 3/18* (2013.01)

(58) Field of Classification Search
CPC ..... H02G 3/065; H02G 3/0666; H02G 15/08; H02G 15/18; H01R 13/74; H01R 13/741;
(Continued)

(56) References Cited

U.S. PATENT DOCUMENTS 1,049,283 A 12/1912 Westphal
1,131,399 A 3/1915 McGinley
(Continued)

FOREIGN PATENT DOCUMENTS

CA 1120113 3/1982
CA 2582792 A1 9/2008
(Continued)

OTHER PUBLICATIONS

French Patent No. 2863682; Date of Publication: Jun. 17, 2005; Abstract Only, 1 page.
(Continued)

*Primary Examiner* — Anjan K Deb
(74) *Attorney, Agent, or Firm* — Cantor Colburn LLP

(57) ABSTRACT

In one embodiment, the conduit connector can comprise: a body comprising a hollow center capable of receiving a conduit in a receiving end, wherein the hollow center extends from the receiving end to the connecting end; a spring disposed within the hollow center and extending out of the connecting end, wherein the spring comprises engagement tangs extending into the hollow center, toward the connection end, and spring tangs extending past the connection end and spaced apart a distance greater than or equal to an opening diameter in a junction box; and an antishort bush located in the connecting end of the body, retaining the spring in the body.

25 Claims, 7 Drawing Sheets

(51) Int. Cl.
*H01R 13/74* (2006.01)
*H02G 3/18* (2006.01)

(58) Field of Classification Search
CPC ..... H01R 13/743; H01R 13/745; Y10T 16/05; Y10T 16/063
USPC ..... 174/660; 439/221, 207, 660
See application file for complete search history.

(56) References Cited

U.S. PATENT DOCUMENTS 1,355,450 A 10/1920 Carlson
1,659,094 A 2/1928 Godfrey
1,801,549 A * 4/1931 Frederickson ..... H01B 17/58 174/83
2,275,800 A 3/1942 Olson
2,365,785 A 12/1944 Tinnerman
2,518,426 A 8/1950 Kinander
2,973,212 A 2/1961 Rose
3,349,946 A 10/1967 Lee
3,369,071 A 2/1968 Tuisku
4,012,578 A * 3/1977 Moran ..... H02G 3/0616 174/51
4,021,604 A 5/1977 Dola et al.
4,151,363 A 4/1979 Nichols
4,180,227 A 12/1979 Gretz
4,192,532 A 3/1980 Pacella
4,198,537 A 4/1980 Mariani
4,302,035 A 11/1981 Ochwat
4,494,779 A 1/1985 Neff et al.
4,496,791 A 1/1985 Reichert et al.
4,619,332 A 10/1986 Sheehan
4,621,166 A 11/1986 Neuroth
4,640,433 A 2/1987 Jorgensen et al.
4,641,863 A 2/1987 Shemtov
4,692,561 A 9/1987 Nattel
4,692,562 A 9/1987 Nattel
4,699,217 A 10/1987 McLennan et al.
4,711,472 A 12/1987 Schnell
4,789,759 A 12/1988 Jones
4,831,496 A 5/1989 Brant et al.
4,842,548 A 6/1989 Bolante
4,872,087 A 10/1989 Brant
4,880,387 A 11/1989 Stikeleather et al. ... H01R 4/64 174/653
4,885,429 A 12/1989 Schnittker
4,919,370 A 4/1990 Martin et al.
4,978,310 A * 12/1990 Shichida ..... H01R 13/7035 200/51.1
4,984,995 A 1/1991 Tucker et al.
4,990,721 A 2/1991 Sheehan
5,059,747 A 10/1991 Bawa et al. ..... H02G 3/0675 174/541
5,068,496 A 11/1991 Favalora
5,118,057 A 6/1992 Martin et al.
5,132,493 A 7/1992 Sheehan
5,171,164 A 12/1992 O'Neil et al.
5,189,258 A 2/1993 Pratesi
5,200,575 A 4/1993 Sheehan
5,204,499 A 4/1993 Favalora
5,266,050 A 11/1993 O'Neil et al.
5,285,013 A 2/1994 Schnell et al.
5,342,994 A 8/1994 Pratesi
5,346,264 A 9/1994 Law et al.
5,373,106 A 12/1994 O'Neil et al.
5,374,017 A 12/1994 Martin et al.
5,405,172 A 4/1995 Mullen, Jr.
5,422,437 A 6/1995 Schnell
5,539,152 A 7/1996 Gretz
5,543,582 A 8/1996 Stark et al.
5,553,787 A * 9/1996 Guginsky ..... H01R 13/595 174/657
D377,506 S 1/1997 Shaw
5,695,368 A * 12/1997 Joly ..... H01R 13/432 439/748
5,731,543 A * 3/1998 Jorgensen ..... H02G 3/0691 174/661
RE35,820 E 6/1998 Guginsky
5,775,739 A 7/1998 Gretz
5,789,706 A 8/1998 Perkins
5,866,853 A 2/1999 Sheehan
5,894,109 A 4/1999 Marik
5,912,431 A * 6/1999 Sheehan ..... 174/653
5,951,327 A 9/1999 Marik
5,959,246 A 9/1999 Gretz
6,020,557 A 2/2000 Jorgensen
6,034,326 A 3/2000 Jorgensen
6,043,432 A 3/2000 Gretz
6,080,933 A 6/2000 Gretz
6,100,470 A 8/2000 Gretz
6,114,630 A 9/2000 Gretz ..... H05K 13/00 174/51
6,114,631 A 9/2000 Gretz
6,133,529 A 10/2000 Gretz ..... F16L 37/008 16/2.1
6,140,582 A 10/2000 Sheehan
6,143,982 A 11/2000 Gretz
6,162,995 A 12/2000 Bachle et al.
6,177,633 B1 1/2001 Gretz
6,194,661 B1 2/2001 Gretz
6,231,088 B1 5/2001 Balthazard et al.
6,262,369 B1 7/2001 Marik et al.
6,300,569 B1 10/2001 Mullen, Jr.
6,310,290 B1 10/2001 Gretz
6,335,488 B1 1/2002 Gretz
6,352,439 B1 3/2002 Stark et al.
6,355,884 B1 3/2002 Gretz
6,380,483 B1 4/2002 Blake
6,444,907 B1 * 9/2002 Kiely ..... 174/657
6,476,319 B1 11/2002 Shemtov
6,479,754 B1 11/2002 Muzslay
6,521,831 B1 * 2/2003 Gretz ..... H01R 13/745 174/153 R
6,521,833 B1 2/2003 DeFreitas
6,537,103 B2 3/2003 Jamison
6,538,201 B1 3/2003 Gretz
D473,333 S 4/2003 Willmorth
6,555,749 B1 4/2003 Pyron
6,555,750 B2 4/2003 Kiely
6,596,939 B1 7/2003 Gretz
6,604,400 B1 8/2003 Gretz
6,642,451 B1 11/2003 Gretz
6,670,553 B1 12/2003 Gretz
6,682,355 B1 1/2004 Gretz
6,709,280 B1 3/2004 Gretz
6,737,584 B2 5/2004 Kiely
6,767,032 B1 7/2004 Gretz
6,768,057 B2 7/2004 Blake
6,780,029 B1 8/2004 Gretz
6,809,263 B2 10/2004 Jackson
6,827,604 B1 12/2004 White
6,849,803 B1 2/2005 Gretz
6,857,606 B1 2/2005 Gretz
6,860,758 B1 3/2005 Kiely
6,872,886 B2 3/2005 Kiely
6,916,988 B1 7/2005 Auray et al.
6,935,890 B1 8/2005 Gretz
6,935,891 B2 8/2005 Kiely
6,957,968 B1 10/2005 Gretz
D515,231 S 2/2006 Randazzo et al.
7,022,914 B1 4/2006 Kiely
7,039,988 B2 5/2006 De France
7,045,714 B1 5/2006 Kiely
7,057,107 B2 6/2006 Auray et al.
7,060,900 B1 6/2006 Gretz
7,064,272 B2 6/2006 Auray et al.
7,064,273 B1 6/2006 Kiely
7,075,007 B2 7/2006 Auray et al.
7,078,623 B1 7/2006 Sheehan
7,126,064 B1 10/2006 Shemtov
7,148,431 B2 12/2006 Pyron
7,151,223 B2 12/2006 Auray et al.
7,154,042 B2 12/2006 Auray et al.

(56) References Cited

U.S. PATENT DOCUMENTS

| | | | | |
|---|---|---|---|---|
| 7,154,054 | B1 | 12/2006 | Gretz | H02G 3/0666 16/2.1 |
| 7,156,671 | B2 | 1/2007 | Kauth | |
| 7,161,095 | B1 | 1/2007 | Gretz | |
| 7,164,086 | B1 | 1/2007 | Kiely | |
| 7,183,486 | B2 | 2/2007 | Pyron et al. | |
| 7,205,489 | B2 | 4/2007 | Auray et al. | |
| 7,211,744 | B2 | 5/2007 | Jorgensen | |
| 7,214,890 | B2 | 5/2007 | Kiely et al. | |
| 7,220,923 | B1 | 5/2007 | Sheehan et al. | |
| 7,226,308 | B1 | 6/2007 | Hanks | |
| 7,226,309 | B1 | 6/2007 | Gretz | |
| 7,238,894 | B1 | 7/2007 | Gretz | |
| 7,304,251 | B1 | 12/2007 | Gretz | |
| 7,329,144 | B1 | 2/2008 | Gretz | |
| 7,338,087 | B2 | 3/2008 | Bartholoma et al. | |
| 7,338,092 | B1 | 3/2008 | Cicconi, III | |
| 7,358,448 | B2 | 4/2008 | Auray et al. | |
| 7,381,088 | B1 | 6/2008 | Gretz | |
| 7,390,979 | B1 | 6/2008 | Johnson | |
| 7,390,980 | B1 | 6/2008 | Gretz | |
| 7,432,452 | B2 | 10/2008 | Gardner | |
| 7,442,079 | B1 * | 10/2008 | Gretz | 174/661 |
| 7,461,870 | B2 | 12/2008 | Blake | |
| 7,485,806 | B1 | 2/2009 | Gretz | |
| 7,488,905 | B2 | 2/2009 | Kiely et al. | H01R 13/745 174/650 |
| 7,495,184 | B1 | 2/2009 | Gretz | H01R 13/5812 16/2.1 |
| 7,500,873 | B1 | 3/2009 | Hart | |
| 7,576,290 | B1 * | 8/2009 | Korcz | H02G 3/0691 16/2.1 |
| 7,820,922 | B2 | 10/2010 | Auray et al. | |
| 7,824,213 | B1 | 11/2010 | Korcz et al. | |
| 8,162,693 | B2 * | 4/2012 | Auray et al. | 174/657 |
| 8,253,043 | B1 * | 8/2012 | Kiely | 174/659 |
| 8,857,039 | B2 | 10/2014 | Sathyanarayana et al. | |
| 2004/0177988 | A1 | 9/2004 | Kiely | |
| 2004/0251682 | A1 | 12/2004 | Pyron | |
| 2008/0053680 | A1 | 3/2008 | Kiely et al. | |
| 2008/0277160 | A1 | 11/2008 | Auray et al. | |
| 2008/0280506 | A1 * | 11/2008 | Ma | H01R 13/111 439/816 |
| 2008/0284163 | A1 | 11/2008 | Proulx et al. | |
| 2009/0215306 | A1 | 8/2009 | Hanks | |
| 2009/0218131 | A1 | 9/2009 | Sheehan et al. | |
| 2010/0084854 | A1 | 4/2010 | Sathyanarayana et al. | |
| 2010/0285699 | A1 | 11/2010 | Auray et al. | |
| 2011/0226084 | A1 | 9/2011 | Chiou | |

FOREIGN PATENT DOCUMENTS

| | | | |
|---|---|---|---|
| CA | 2728542 | A1 | 8/2011 |
| FR | 2863682 | A1 | 6/2005 |
| GB | 1422355 | | 1/1976 |
| GB | 1422355 | A | 1/1976 |
| GB | 2177268 | A | 1/1987 |

OTHER PUBLICATIONS

French Patent No. 2863682 (A1); Publication Date: Jun. 17, 2005; Abstract Only; 1 Page.

* cited by examiner

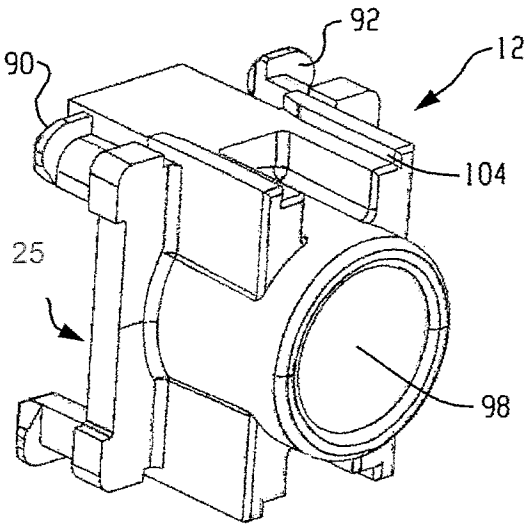
Fig. 12
Amended

CONDUIT CONNECTOR AND METHODS FOR MAKING AND USING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application *is a reissue application of U.S. patent application Ser. No. 13/409,409, filed Mar. 1, 2012, which* claims priority to U.S. Provisional Application Ser. No. 61/448,872, filed on Mar. 3, 2011, the entire contents of which are incorporated herein by reference.

TECHNICAL FIELD

The instant application relates to adapters for connecting conduits to enclosures, e.g., conduit connectors for connecting electrical conduit to junction boxes, outlet boxes, or other enclosures.

BACKGROUND

The most common use for electrical conduit connectors is to facilitate the connection of a conduit or cable to a junction box. The junction box can be a variety of electrical enclosures such as an outlet box, transformer enclosure, circuit panel, lighting fixture—the list is nearly endless. Similarly, the conduit can be rigid or flexible, or could be hose, other tubing capable of routing electrical wire, or cable. Cable can be non-metallic sheathed cable, portable cord, or a variety of other types of electrical conductors. The instant application is equally successful in connecting a plurality of types of conduits, cables, and other electrical conductors to a wide variety of boxes and other enclosures. Therefore, as used in this specification, the term conduit is not limited to standard rigid electrical conduit, but shall be intended to mean any type of conduit, any type of cable, or any other type of electrical conductor. Many commercial and residential buildings have electrical installations with many types of conduit-to-junction-box connections that utilize electrical connectors.

The two most common types of electrical connectors used are a snap-in connector, and a multipart connector which can be composed of two or more components that utilizes a threaded male end in conjunction with a threaded female locknut, hereinafter referred to collectively as a two-part locknut connector. In the case of the two-part locknut connector, the male threaded end is inserted into the junction box through a knockout (e.g., a hole or other opening). A rigid connection is established by threading the lock nut onto the male end in the junction box interior. The snap-in connector is another commonly used connector, which utilizes a snap ring to quickly connect it to the junction box. Either type of connector is integrated with an adapter end, which allows the attachment of conduit, cable, or a variety of types of hollow tubing.

The installation of electrical systems is generally expensive as an electrician must first install the enclosures, route conduit between each enclosure, and install connectors and then pull all necessary electrical wiring through the conduit.

In other words, installation is expensive because it is labor intensive. The commercially available electrical connectors are one factor accentuating the labor intensiveness. Locknut connectors increase the cost of installing electrical systems for a number of reasons. The current art two-part locknut connectors are plagued with labor intensive problems. First, the locknut connectors are shipped from the manufacturer preassembled. That is, the electrician must first remove the locknut from the male end before it can be installed. Once the male end of the connector is placed through the knockout, the electrician must rethread the locknut onto the connector from the interior of the junction box.

Two hands are required to disassemble and then reassemble the connectors in the knockout. Consequently, it is difficult to hold a tool or a piece of conduit while reassembling the connector. Once the locknut is threaded it must be tightened. In accordance with many building codes and safety regulations, connectors must be firmly and reliably attached to junction boxes. To properly tighten the two-part locknut connector, the electrician must use a tool, usually a set of pliers or a screwdriver. Occasionally, when the proper tool is unavailable, an electrician will use any object within reach. These situations, while rare, raise serious safety issues. In many instances, however, to "get the job done" the locknut is "finger" tightened. Those persons skilled in the art know that finger tightened two-part locknut connectors can eventually loosen, and a loose connector can cause great strain to be put onto the electrical wires and their connections resulting in an increase in the probability of an electrical fire or other electrical problems, such as poor grounding.

Secondly, when the electrician disassembles the fitting by taking the locknut off the connector, the locknut can be dropped or misplaced. This can occur when the electrician is in an elevated position, such as, on a scissor lift or on scaffolding because the electrical conduit is often installed in out-of-the-way places like in rafters and above ceilings. If the locknut cannot be found, the connector is useless. If the electrician decides to retrieve the dropped locknut, the installation time is prolonged.

A third common problem with the present locknut connectors is the locknut is easily cross threaded onto the male thread. When this occurs, the electrician must usually use a tool to remove the locknut. On occasion, cross threading the locknut will damage the male threads on the connector making it difficult or impossible to reuse the connector. Again, the electrician must spend their time either removing the defective connector or forcing the locknut through the damaged portion of the threads.

A fourth problem with the present two-part locknut connectors is the distance the male end protrudes into the junction box. In some installations, the space inside the enclosure is already minimal. The space limitation becomes an acute problem when an additional connector is installed. The male threaded end protrudes well past the depth of the locknut and may interfere with another connector, the contents of the enclosure, or wiring inside the box. Therefore, in a limited space enclosure, the excess thread must be removed. Typically, the electrician may clip off some of the receptacle or mounting screws, or completes a combination of space enlarging modifications, all of which prolong installation time and threaten the integrity of the system as designed. A fifth common problem with the present two-part locknut connectors occurs during disassembly of the connector from the enclosure. Electricians may disassemble an installation for a variety of reasons. The disassembly of the locknut connector is more time consuming than the installation. If the locknut was installed properly, that is, by tightening it with a tool, then the locknut must be removed with a tool. Similar to the installation, if the threads are damaged during disassembly, the connector is useless. Also similar to the installation problems, if the locknut is lost, it must be replaced if the connector is to be used again. The snap-in connector presents similar problems. However, the most significant problem is that these connectors, in most cases, do not create a rigid connection. Because the snap ring is sized to accept a variety of box wall thickness, it does not rigidly attach to many boxes. The loose fit may cause electrical continuity problems, a highly dangerous situation, since the box, the conduit, and the connector are intended to be part of the electrical grounding system in some applications.

There remains an unfulfilled need to provide a generally universal connector that is easy to use; e.g., which can be installed quickly and easily without tools, does not require access to the interior of the junction box, and/or can be easily removed and reused in the box.

BRIEF SUMMARY

Disclosed herein are conduit connectors and methods for making and using the same.

In one embodiment, the conduit connector can comprise: a body comprising a hollow center capable of receiving a conduit in a receiving end, wherein the hollow center extends from the receiving end to the connecting end; a spring disposed within the hollow center and extending out of the connecting end, wherein the spring comprises engagement tangs extending into the hollow center, toward the connection end, and spring tangs extending past the connection end and spaced apart a distance greater than or equal to an opening diameter in a junction box; and an antishort bush located in the connecting end of the body, retaining the spring in the body.

A method of using the conduit connector can comprise inserting a conduit into the channel so that the engagement tangs physically contact grooves along the outer surface of the conduit; and inserting the spring tangs into an opening (e.g., in a junction box), until the side lugs engage the inner surface of the box.

These and other features of the conduit connector and method will be understood from the drawings and description below.

BRIEF DESCRIPTION OF THE DRAWINGS

Refer now to the figures, which are merely exemplary, not limiting, and wherein like elements are numbered alike.

FIG. 12 is a perspective view of an embodiment of the anti short bush of FIG. 3.

DETAILED DESCRIPTION

Disclosed herein are conduit connectors capable of connecting to an enclosure, e.g., capable of connecting an electrical conduit to a junction box. The conduit connector comprises a body, a spring, and an antishort bush. The spring inserts into the body and can be held in place with the antishort bush and/or due to connection(s) with the body. During use, tangs of the spring extend into and hold the connector to a junction box, while flanges extending from the spring engage and retain a conduit in side the body.

The conduit connector answers a long felt need for an electrical connector which can be installed quickly and easily without tools and does not require access to the interior of a junction box. The electrical connector has utility, among other uses, in the connection of a conduit to an enclosure (e.g., to an electrical junction box) through an opening in the side of the box commonly referred to as a knockout. Additionally, although this connector securely engages the enclosure and is not easily dislodged due to bumping or otherwise, it can be easily removed if desired. The conduit engagement region can cooperate with a variety of conduit, cables, and other electrical conductors.

Figure 1:
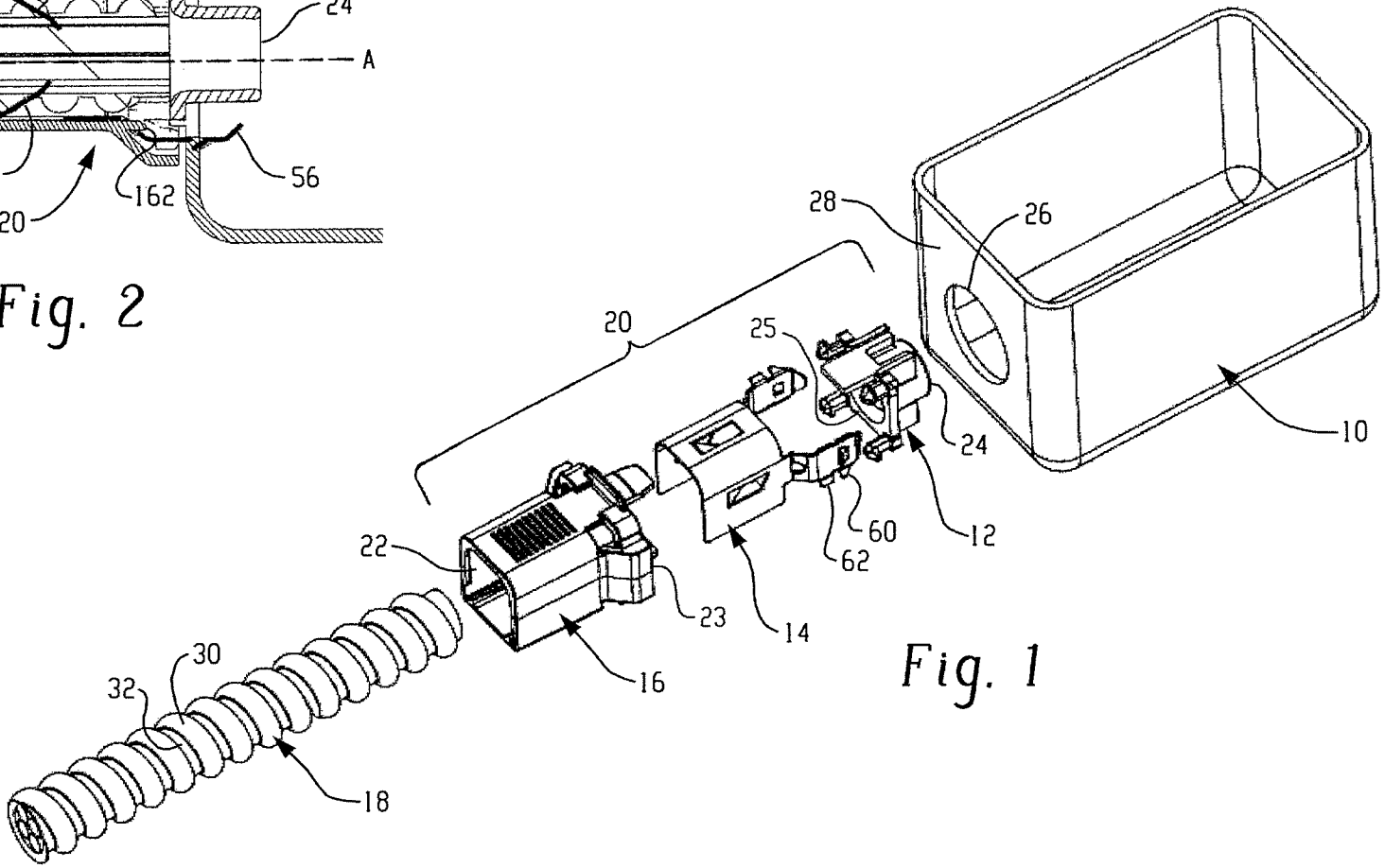
FIG. 1 is an exploded, disassembled, prospective view of an embodiment of a conduit connector, conduit, and junction box.
Figure 2:
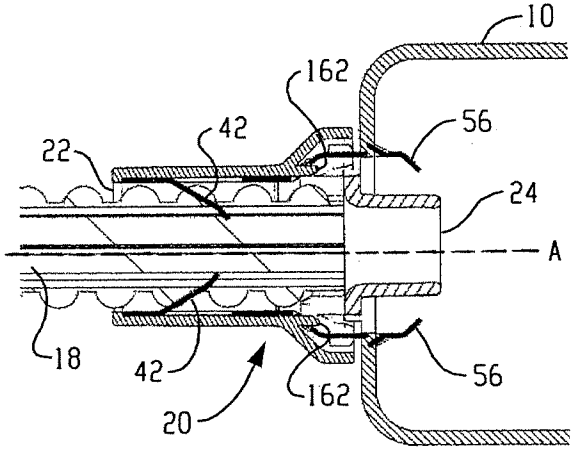
FIG. 2 is a cross-sectional side view of the conduit connector of FIG. 1 connecting a conduit to a junction box taken along lines 2-2 of FIG. 3.
Figure 3:
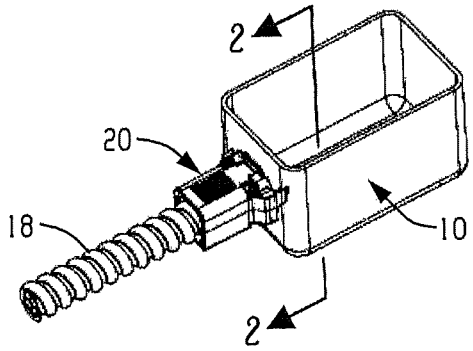
FIG. 3 is a perspective view of the conduit connector of FIG. 1 connecting a conduit to a junction box.
Figure 4:
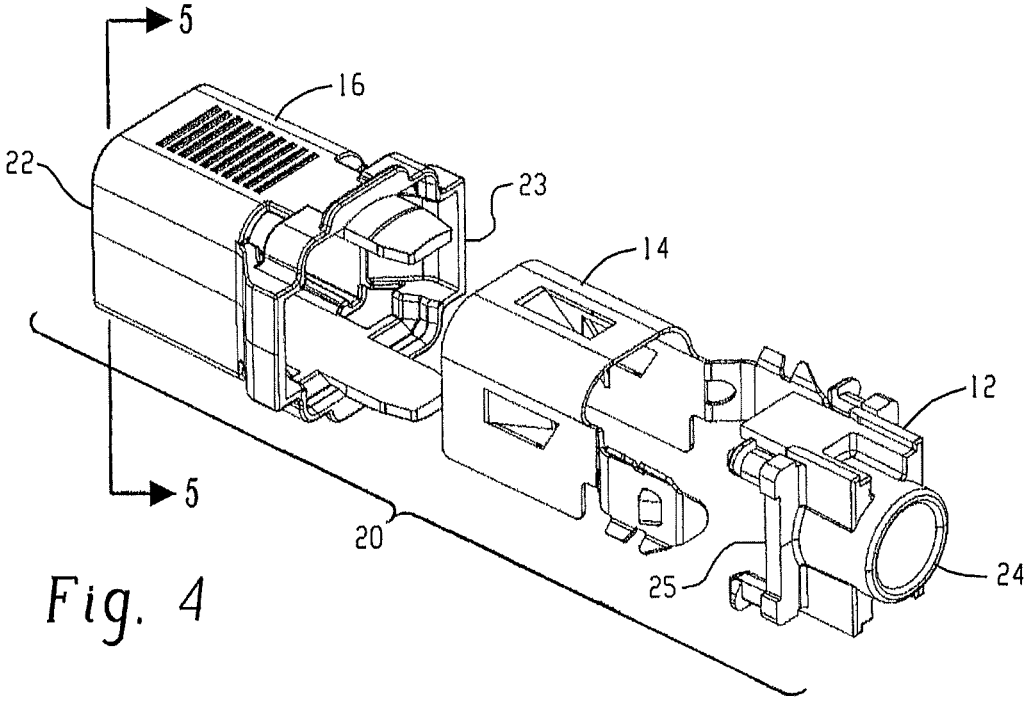
FIG. 4 is an exploded (disassembled) perspective view of an embodiment the conduit connector elements.
Figure 5:
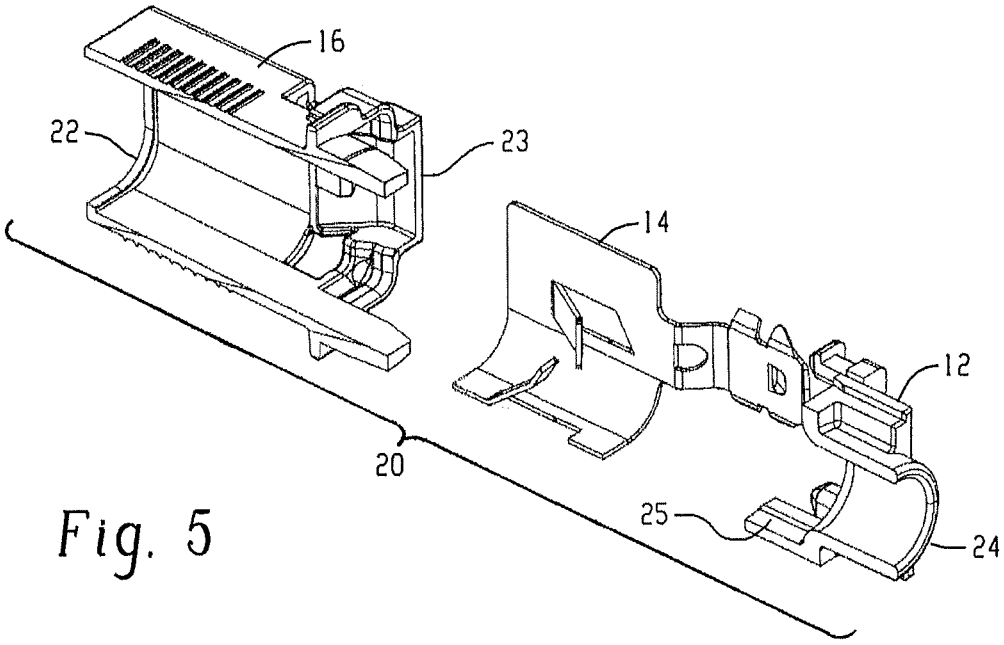
FIG. 5 is an exploded (disassembled) cross-sectional view of the embodiment the conduit connector elements of FIG. 4 taken along lines 5-5.
Figure 6:
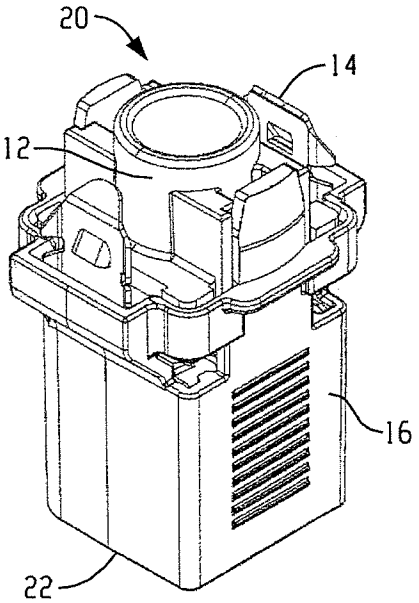
FIG. 6 is an assembled, perspective view of the embodiment of the conduit connector elements of FIG. 4.

Referring now to FIGS. 1-3, these figures illustrate the overall view of the conduit connector along with a conduit and a junction box. FIG. 1 provides an expanded view showing the junction box 10 located adjacent the connecting end 24 of [the conduit connector 20] *an antishort bush 12*, with a conduit 18 located adjacent the receiving end 22 *of a body 16. The body 16 includes a connecting end 23 and the antishort bush 12 includes a receiving end 25.* From the connecting end 24 *of the antishort bush 12* to the receiving end 22 *of the body 16*, the conduit connector 20, comprises the antishort bush 12, the spring 14, and the body 16. FIGS. 2 and 3 illustrate the assembled connector 20 attached to the junction box 10 and engaging the conduit 18. In these figures the conduit 18 extends into the body 16 wherein receiving tangs 42 engage the outer convolutions of the conduit 18, inhibiting the conduit 18 from being withdrawn from the body 20 through the receiving end 22 *of the body 16*. Connecting tangs 56 extend through the opening 26 in the side of the junction box 10, and engage the sides thereof to prevent the inadvertent removal or dislodging of the conduit connector 20 from the box 10. FIGS. 4-6 provide further views of the conduit connector 20 of FIG. 1.

FIGS. 7-10 illustrate embodiments of a spring that is used to engage both the conduit 18 and the box 10. The spring 14 is so sized and configured that a main portion 40 adjacent the [receiving end 24] *connecting end 23 of the body 16* is disposed within the body 16, when the conduit connector is assembled. The main portion 40 of the spring can be enclosed with a cavity extending therethrough or have an open side with a channel 70 extending therethrough. The overall shape is complementary to the shape of the body so as to be inserted and retained within the body 16. Some possible main portion 40 shapes include various polygonal shapes (e.g., U-shaped, rectangular, square, pentagonal, and so forth). Optionally, the [body] *spring 14* can comprise aperture(s) 72 adjacent to the receiving end [22] *25 of the antishort bush 12*, e.g., can comprise a channel and an aperture 72 adjacent to each corner at the receiving end *25 of the antishort bush 12*. In some embodiments the main portion 40 comprises three sides. The opposing sides are arranged substantially perpendicular to the connecting side. The corners where the sides connect can be squared corners or can be rounded.

Figure 8:
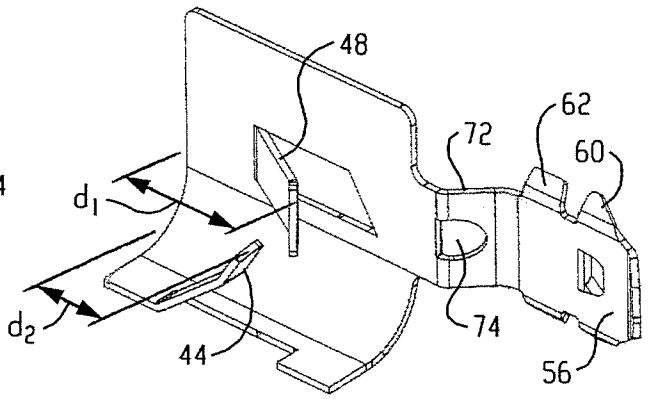
FIG. 8 is a perspective cross-sectional view of the spring of FIG. 7 taken along lines 9-9.
Figure 7:
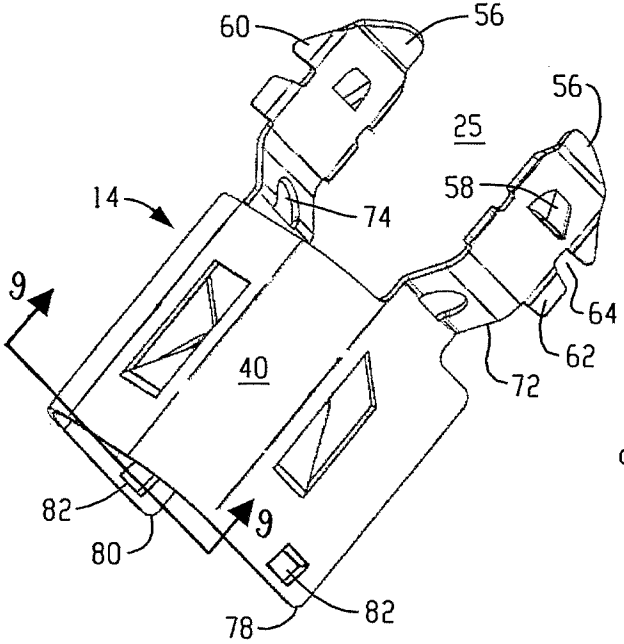
FIG. 7 is a perspective view of an embodiment of a spring for the conduit connector.

Extending inward and toward the [connecting end 24] *antishort bush 12* is a plurality of receiving tangs 42. The receiving tangs 42 can form a shape that will align the conduit 18 within the connector 20. For example, the tangs can form a generally V-shaped profile that will align the conduit 18 in the channel (e.g., can align the conduit 18 in the center of the connector 20). Each tang 42, can, individually, have a shape for gripping and restraining the conduit 18 and optionally for aligning the conduit 18. For example, the spring 14 can comprise 3 receiving tangs 42. The central receiving tang 44 can angle from the sides down toward the middle (e.g., to form a V-shaped end), the first side receiving tang 46 and the second side receiving tang 48 can both have diagonal ends 50,52, respectively, that angle toward the central receiving tang 44, to attain the generally V-shaped profile (dotted line 54). Furthermore, the ends 50,52 can have an angle that is commensurate with the angle of curvature of the conduit convolutions. Optionally, each tang 44,46,48 can be oriented to extend into the body at the same distance from the receiving end 22 or can extend at different distances. For example, tang 44 can extend into the channel 70 at a distance $d_1$ from receiving end 22, while tang 48 can extend at a different distance $d_2$ from receiving end 22 as is illustrated in FIG. 8, wherein the distance is from the receiving end to the point of the tang that would engage a conduit.

Extending from the main portion 40 of the spring 14 can be connector tang(s) 56, such as at least two opposing connector tangs 56. At the base of the tang 56 can be an aperture 74 configured to receive a knob on the body 16, e.g., enhancing alignment of the spring within the body 16. Each connector tang 56 can have an optional center lug 58. This lug 58 can ease insertion through the opening in the box and can facilitate retention of the tangs 56 within the box, e.g., in case of external side forces. This tang extends outward from a surface 66 (e.g., main body portion) of the tang 56, while the connector lugs extend from opposite sides of the tangs 56. The lugs can be angled outward, e.g., to further enhance the engagement with the box (e.g., to prevent unintentional withdrawal from the knockout), and/or to enhance electrical grounding connection.

Each tang 56 comprises a set of side lugs 60. The side lugs 60 can be angled toward the receiving end *25 of the antishort bush 12*, e.g., have a negative angle, θ, e.g., to avoid disengagement of connector after applying pulling load. The side lugs can be angled such that the connecting tang 56 diverges from near the end 68 toward the main body 40 (e.g., the side lugs 60 can have a generally triangular shape) to allow facile insertion into the box 10.

Engaging the outside of the box when the connector is attached to the junction box are the outside lugs 62. In other words, the wall 28 of the junction box 10 is engaged on an inner surface by side lugs 60 and on an outer surface by outside lugs 62; being located in the valley 64 therebetween. The valley 64 can be sized and shaped to receive a variety of junction box wall thicknesses. For example, the outside lugs 62 can also optionally comprise a negative angle Φ that allows different size walls to be readily received and securely engaged within the valley 64. Angle Φ can be an angle of 10 to 20 degrees, specifically, 13 to 17 degrees.

Figure 14:
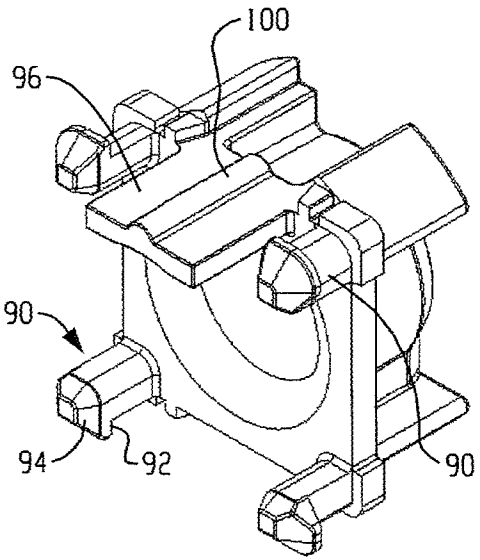
FIG. 14 is another perspective view of the antishort bush of FIG. 13.
Figure 13:
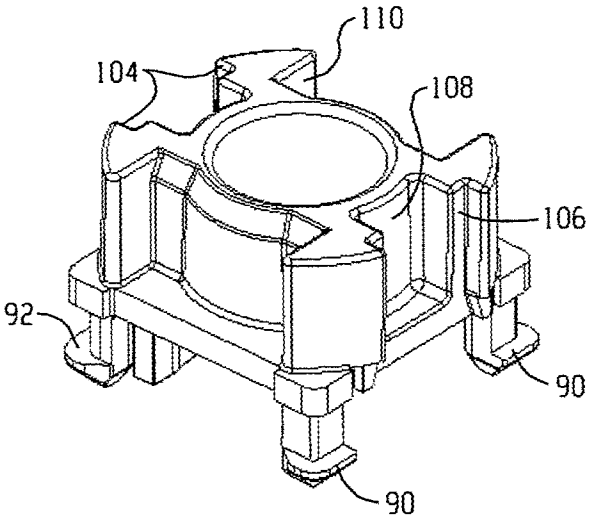
FIG. 13 is a perspective view of another embodiment of an antishort bush for a conduit connector.
Figure 17:
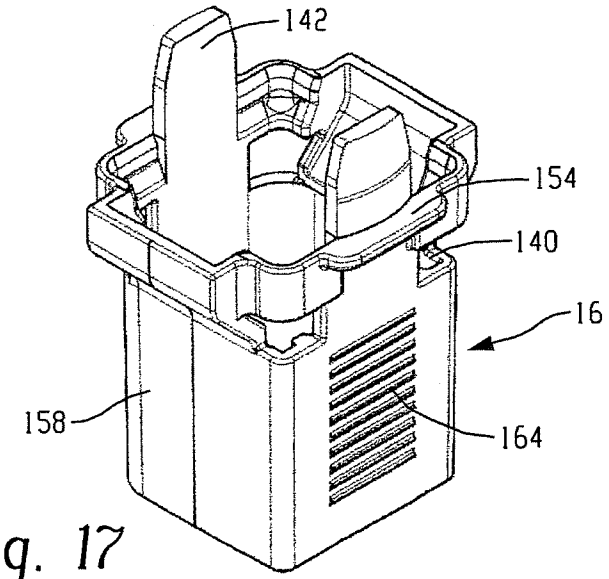
FIG. 17 is a perspective view of the conduit connector body of FIG. 3.
Figure 18:
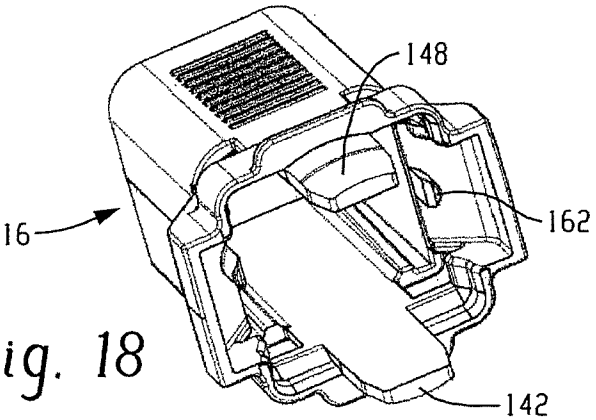
FIG. 18 is another perspective view of the conduit connector body of FIG. 3.

Located at the [receiving end] *connecting end 23* of the body 16 is the antishort bush 12. (See FIGS. 12-14) The antishort bush 12 is designed to connect to the body 16 at the connecting end [24] *23*, such that the connecting tangs 56 extend along the sides of the antishort bush 12. The antishort bush 12 comprises projections 90 for snap engagement with the body 16. The number of snap engagements is dependent upon the general shape of the body and of the antishort bush. For a generally square cross-sectional body shape, two or more projections 90 can be employed, with four or more generally used for secure engagement. Each projection can comprise a lip 92 configured to engage an opening 140 in the body 16 (see FIG. 16). The projection 90 can extend toward the receiving end 22 with the lip 92 extending outward at a complementary angle from the body to engage the opening 140, e.g., at an angle of 90° to the central axis A. (See FIG. 2) The foot 94 of the projection 90 can be angled so as to enable facile insertion into the body 16 and so as to facilitate flexing of the projection 90. For example, the foot 94 can have a generally conical (e.g., truncated conical) shape that narrows towards the receiving end 22. The angle of the foot can be different on different sides of the foot 94. For example a lower angle can extend from the end of the lip 92 to the bottom of the foot 94 than on another side of the foot 94.

In all embodiments, along one or more sides of the antishort bush 12 that will extend into the body 16 over the spring 14, can optionally be a restrictor 96. The restrictor 96 can extend toward the [receiving end] *connecting end 23 of the body 16* at a distance that is equal to or greater than the projections 90. When the connector 20 is assembled, the restrictor 96 can restrict movement of the spring 14 in the body 16, e.g., in one axial direction. For example, the restrictor 96 can be configured to restrict the side of the spring comprising the center lug between the restrictor 96 and a side of the body 16. Extending from the restrictor 96, in a direction away from channel 98 can optionally be rib(s) 100, e.g., to assist in orientation of the antishort bush 12 in body 16. The rib 100 can extend along axis A for all or part of the length of the restrictor 96.

At the connecting end 24 of the antishort bush 12 can be a chamfer, e.g., to allow bending of the connecting tangs 56 during insertion of the connector 20 through the opening 26.

Figure 15:
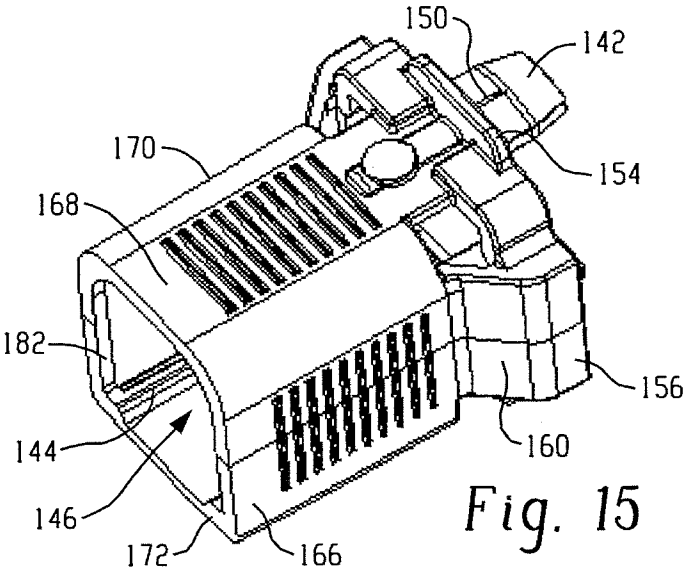
FIG. 15 is a perspective view of an embodiment of a conduit connector body.
Figure 16:
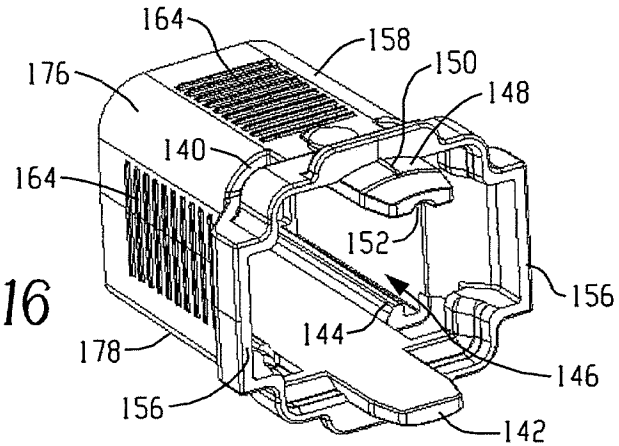
FIG. 16 is another perspective view of the conduit connector body of FIG. 15.
Figure 20:
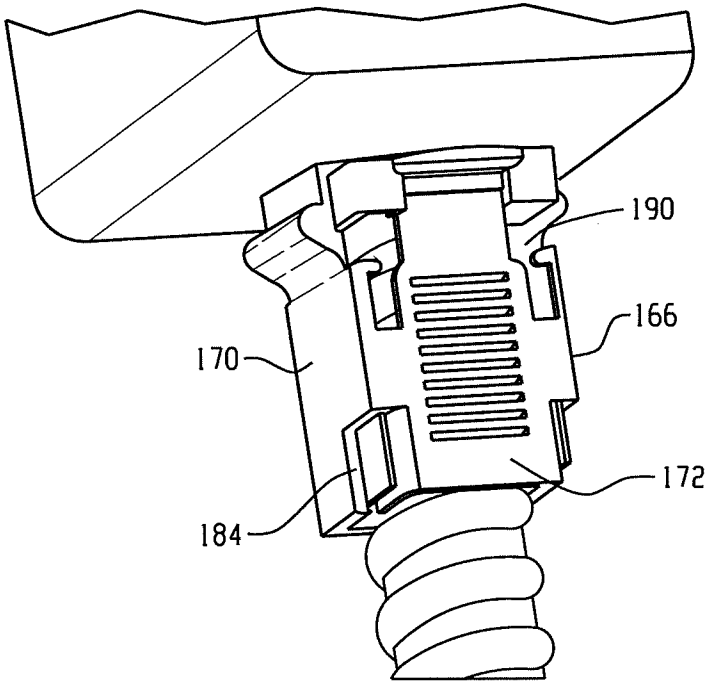
FIG. 20 is a bottom perspective view of the conduit connector of FIG. 19 connected to a junction box.
Figure 19:
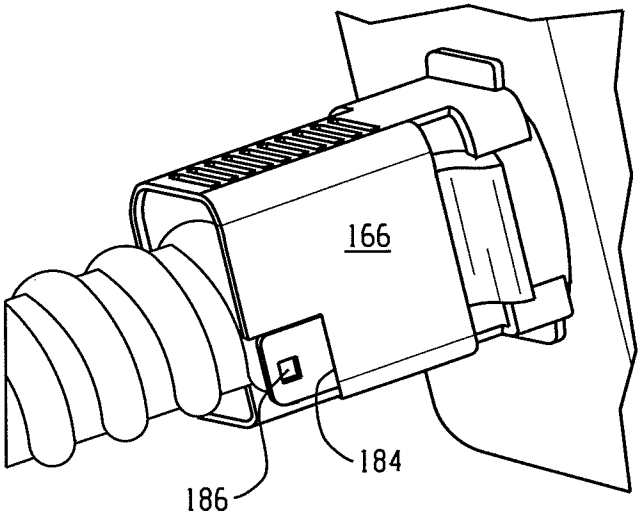
FIG. 19 is a side perspective view of another embodiment of a conduit connector attached to a junction box.

Along the sides of the antishort bush 12 can be cavity(ies) 108 each located and configured to receive a body lug 142 (See FIGS. 15 and 16). The cavity 108 has a distance between the walls 104 that is greater than or equal to the width of the body lug 142. While the connector is entering the opening in the box, the body lug 142 comes down into the channel. The lip 106 restricts the body lug movement into the channel.

Now referring to FIGS. 15-18, the body 16 comprises a shape configured to receive the spring main portion 40 within the body cavity 146 and the antishort bush 12 at the connecting end [of] *23* the body 16. At the [receiving end] *connecting end 23* of the body 16 can be body lug(s) 142 that extend along the axis A from the connecting end [24] *23* of the body 16. The body lug(s) 142 can be designed to have a rounded or chamfer outer body 148, e.g., to facilitate insertion into the junction box. Extending from the outer surface of the body lug 142 can be crush rib(s) 150. This rib 150 can provide a tight fit with the opening 26, crushing as necessary to enable insertion of the connecting end 24 into the box 10. On the opposite side of one or more of the body lug(s) 142 can be a groove 152 oriented and designed to receive the antishort bush rib 100. In the various embodiments, two or more body lugs 142 can be provided. The optional body lug(s) can facilitate the entry of the connector into the hole in the box and/or can establish a good contact with the body to decrease the contact resistance between the box and the connector (e.g., resulting in good grounding connection).

Also located at the connecting end [24] *23* of the body 16 can be a stop protrusion extending outward from the body 16 and configured to limit the insertion of the connector 20 into the opening 26. In addition to the stop protrusions 154, the body 16 can comprise extensions 156 that angle outward from the main body portion 158. The extensions 156 can also limit the amount of that the connector 20 at extends into the box 10. In many embodiments, the body comprises two extensions 156 on opposite sides, with two body lugs 142 on the other two opposing sides. The extensions 156 flare away from the main body portion 158 so as to receive the tangs 56 in their relaxed state. Therefore, the extension 156 can have a diverging area 160 that diverges at an angle complementary to the outward flare 72 of the spring 14. Within the extension 156 can be a knob 162 that has a size and shape to extend into aperture 74 of the spring 14 when the connector 20 is assembled.

The main body portion 158 can comprise grips 164 on one or more sides thereof. The grips 164 can be any combination of elements that facilitates gripping of the main body portion 158, e.g., serrations, depressions, protrusions (e.g., bumps), holes, as well as combinations comprising at least one of the foregoing.

Figure 11:
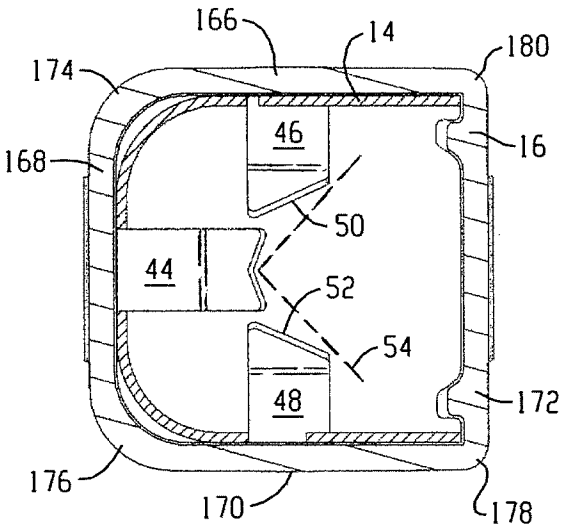
FIG. 11 is a bottom view of a spring assembled within a body.
Figure 10:
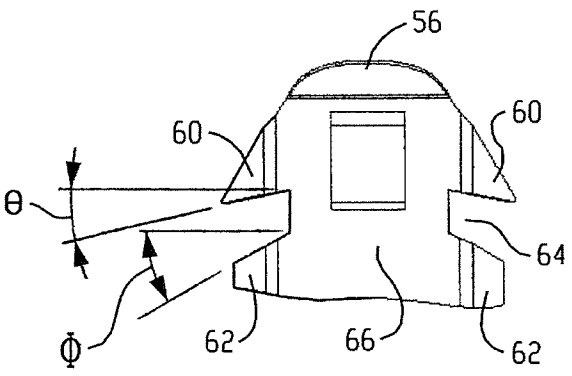
FIG. 10 is a partial side view of a connecting tang for the spring of FIG. 9.
Figure 9:
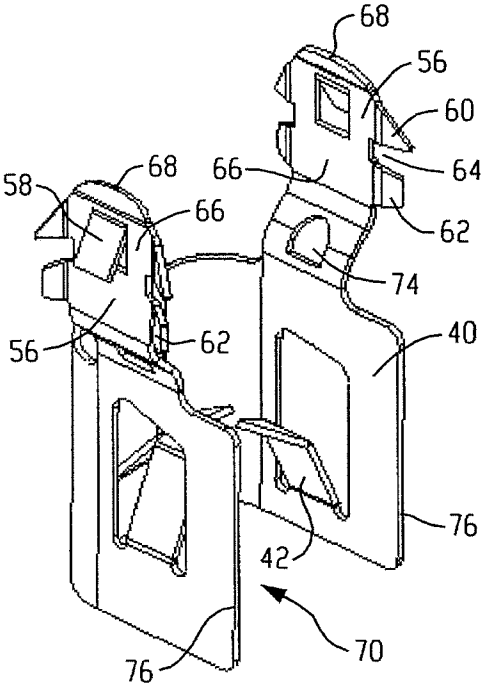
FIG. 9 is a perspective view of another embodiment of a spring for a conduit connector.

The shape of the main body portion 158 is complementary to the spring shape. The main body portion can be polygonal (e.g., square, rectangular, and so forth). For example, three sides can form a U-shape (e.g., sides 166,168,170), with the fourth side (172) merely covering the opening (e.g., see the cross-sectional view of FIG. 11), e.g., forming a generally square shape. As can be seen, the sides can meet in a rounded corner (174,176) or a squared corner (178,180). The forth side 172 can comprise guide rib(s) 144 extending adjacent to the sides 166,170 to guide the edges 76 of the spring 14 when inserting the spring into the body 16, and to prevent the edges from bending inward, into body cavity 146.

At the connecting end *23* of the main body portion 158 are the openings 140 each sized and configured to receive one of the antishort bush projections 90. At the receiving end 22 of the body 16 can be a collar 182 that prevents the spring from being forced out of the receiving end [of the body] *22 body 16*; e.g., the collar can restrict the spring in one of the axial directions. Also at the receiving end *22* of the main body portion 158 can be a slot 184 in one or more sides (e.g., in opposite sides 166, 170) sides and located to allow the corners 78,80 of the spring 14 to extend through the slot 184 such that the jut 186 extends into window 82, e.g., to further secure the spring within the body.

The main body portion 158 can also optionally comprise pocket(s) 190 configured to receive lug 90/92 from the antishort bush 12, e.g., to retain the spring in the body.

The conduit connector can be formed of various materials as appropriate for the particular element. For example, the body can comprise a metal or metal alloy, such as zinc, aluminum, steel, as well as combinations comprising at least one of the foregoing (e.g., zinc alloy, aluminum alloy, and/or steel alloy). The spring can comprise a material such as steel, (e.g., spring steel and/or stainless steel), as well as combinations comprising at least one of the foregoing. The antishort bush can be formed of a plastic, such as engineering plastics.

In use, a conduit 18 (e.g., an electrical conduit) is inserted through the body 16 until the conduit is accessible at a connecting end 24 of that will be inserted into the enclosure 10. As the conduit 18 is inserted into the body 16, the coils (peaks) 30 of the conduit 18 cause the receiving tangs 42 cantilever outward towards the walls of the body 16 and spring inward as the valleys 32 of the conduit 18 reaches the ends of the receiving tangs 42. As the conduit 18 is inserted into the body 16, the center lug 58 guides the conduit into the desired location within the body.

In one embodiment, the conduit connector can comprise: a body comprising a hollow center capable of receiving a conduit in a receiving end, wherein the hollow center extends from the receiving end to the connecting end; a spring disposed within the hollow center and extending out of the connecting end, wherein the spring comprises engagement tangs extending into the hollow center, toward the connection end, and spring tangs extending past the connection end and spaced apart a distance greater than or equal to an opening diameter in a junction box; and an antishort bush located in the connecting end of the body, retaining the spring in the body.

A method of using the conduit connector can comprise inserting a conduit into the channel so that the engagement tangs physically contact grooves along the outer surface of the conduit; and inserting the spring tangs into an opening (e.g., in a junction box), until the side lugs engage the inner surface of the box.

In the various embodiments, (i) each spring tang can comprise an aperture that receives a knob on the body; and/or (ii) each spring tang can comprise a center lug extending outward from a spring main portion, away from the spring and toward the receiving end; and/or (iii) each spring tang can comprise side lugs angled toward the receiving end at an angle so that, once the connector is attached to an opening, the lugs avoid disengagement after applying a pulling load; and/or (iv) the side lugs form wings on opposite sides of each spring tang and have a shape that diverges from near an end of the spring tang toward the receiving end; and/or (v) a spring main portion can have three sides, with the spring tangs extending from two opposite sides, and the engagement tangs extend into the channel from all three sides; and/or (vi) the engagement tangs form a generally V-shaped profile that is configured to align a conduit in the channel; and/or (vii) the engagement tangs can comprise a central receiving tang that is angled from the sides into the channel and having a generally V-shaped end, and a first side receiving tang having a diagonal ends that angles toward the central receiving tang and a second side receiving tang having a diagonal end angled toward the central receiving tang forming a generally V-shaped profile of the engagement tangs; and/or (viii) each engagement tang can extend into the body at a different distance than another engagement tang; and/or (ix) the antishort bush can further comprise a restrictor extending toward the receiving end, wherein the restrictor restricts movement of the spring; and/or (x) the antishort bush can comprise projections that extend toward the body and through an opening such that a foot on the projection snapfits the antishort bush onto the body; and/or (xi) near the receiving end, the body can comprise a slot such that a corner at the receiving end of the spring passes through the slot and a window near the corner engages a jut on the body; and/or (xii) the body can have a polygonal shape.

Before or after the conduit 18 is disposed within the body 16, the conduit connector 20 can be connected to the junction box 10. Connection to the box 10 comprises exerting force on the conduit connector 20 in the direction of the opening 26. As the connector tangs enter the opening 26, they pivot (cantilever), decreasing the outer diameter of the spring 14, and enabling the side lugs 60 to pass into the box 10. Once the lugs 60 have passed through the opening 26, the connector tang springs outward causing the wall 28 to be located in the valley 64, the side lugs to be located within the box 10, and the outside lugs to be located outside the box 10, thereby grasping the box opening 26 and holding the connector 20 to the box 10. If the center lug(s) 58 are present along the connector tang(s) 56, they facilitate the inward flexing of the connector tang 56 as it passes through the opening 26.

What is claims is:

1. A conduit connector, comprising:

a body comprising a hollow center capable of receiving a conduit in a receiving end, wherein the hollow center extends from the receiving end to [the] *a* connecting end;

a spring disposed within the [hollow center and extending out of the connecting end] *body*, wherein the spring comprises engagement tangs extending into the hollow center[, toward the connection end] *wherein the engagement tangs are configured to physically contact grooves along an outer surface of a conduit when the conduit is inserted into the body*, and spring tangs extending past the [connection] *connecting* end and spaced apart a distance greater than or equal to an opening diameter in a junction box; and an antishort bush located in the connecting end of the body[, retaining the spring in the body].

2. The conduit connector of claim 1, wherein each spring tang comprises an [aperature] *aperture* that receives a knob on the body.

3. The conduit connector of claim 1, wherein each spring tang comprises a center lug extending outward from a spring main portion, away from the spring and toward the receiving end.

4. The conduit connector of claim 1, wherein each spring tang comprises side lugs angled toward the receiving end at an angle so that, once the connector is attached to an opening, the lugs avoid disengagement after applying a pulling load.

5. The conduit connector of claim 4, wherein the side lugs form wings on opposite sides of each spring tang and have a shape that diverges from near an end of the spring tang toward the receiving end *of the antishort bush*.

6. The conduit connector of claim 1, wherein a spring main portion can have three sides, with the spring tangs extending from two opposite sides, and the engagement tangs extend into the channel from all three sides.

7. The conduit connector of claim 6, wherein the engagement tangs *angle toward each other to* form a generally V-shaped profile that is configured to align [a] *the* conduit in the [channel] *center of the connector*.

8. The conduit connector of claim 6, wherein the engagement tangs comprise a central receiving tang that is angled from the sides into the channel and having a generally V-shaped end, and a first side receiving tang having a diagonal [ends] *end* that angles toward the central receiving tang and a second side receiving tang having a diagonal end angled toward the central receiving tang forming a generally V-shaped profile of the engagement tangs.

9. The conduit connector of claim 6, wherein each engagement tang extends into the body at a different distance than another engagement tang.

10. The conduit connector of claim 1, wherein the antishort bush further comprises a restrictor extending toward the [receiving end] *connecting end of the body*, wherein the restrictor restricts movement of the spring.

11. The conduit connector of claim 1, wherein the antishort bush comprises projections that extend toward the body and through an opening such that a foot on the projection snapfits the antishort bush onto the body.

12. The conduit connector of claim 1, wherein, near the receiving end, the body comprises a slot such that a corner at the receiving end of the spring passes through the slot and a window near the corner engages a jut on the body.

13. The conduit connector of claim 1, wherein the body has a polygonal shape.

14. A conduit connector, comprising:

a body comprising a hollow center capable of receiving a conduit in a receiving end and a knob, wherein the hollow center extends from the receiving end to [the] *a* connecting end;

a spring disposed [within] *into* the [hollow center and extending out of the connecting end] *body*, wherein the spring comprises engagement tangs extend into the hollow center, toward the [connection] *connecting* end, wherein the engagement tangs *angle toward each other to* form a generally V-shaped profile that is configured to align a conduit in the channel, spring tangs comprise a center lug extending outward from a spring main portion, away from the spring and toward the receiving end, wherein the spring tangs [extend past the connection end and] *are* spaced apart a distance greater than or equal to an opening diameter in a junction box, and wherein each spring tang comprises side lugs angled toward the receiving end at an angle so that, once the connector is attached to an opening, the lugs avoid disengagement after applying a pulling load; and an aperture that received the knob; *and* an antishort bush located in the connecting end of the body[, retaining the spring in the body].

15. The conduit connector of claim 14, wherein the side lugs form wings on opposite sides of each spring tang and have a shape that diverges from near an end of the spring tang toward the receiving end *of the antishort bush*.

16. The conduit connector of claim 14, wherein a spring main portion can have three sides, with the spring tangs extending from two opposite sides, and the engagement tangs extend into the channel from all three sides.

17. The conduit connector of claim 16, wherein the engagement tangs comprise a central receiving tang that is angled from the sides into the channel and having a generally V-shaped end, and a first side receiving tang having a diagonal ends that angles toward the central receiving tang and a second side receiving tang having a diagonal end angled toward the central receiving tang forming a generally V-shaped profile of the engagement tangs.

18. The conduit connector of claim 16, wherein each engagement tang extends into the body at a different distance than another engagement tang.

19. The conduit connector of claim 14, wherein antishort bush further comprises a restrictor extending toward the [receiving] *connecting* end *of the body*, wherein the restrictor restricts movement of the spring, and comprises projections that extend toward the body and through an opening such that a foot on the projection snapfits the antishort bush onto the body.

20. The conduit connector of claim 14, wherein, near the receiving end, the body comprises a slot such that a corner at the receiving end of the spring passes through the slot and a window near the corner engages a jut on the body.

*21. A conduit connector, comprising:*

*a hollow body capable of receiving a conduit in a receiving end, wherein the body has a rectangular body shape, wherein the body extends from the receiving end to a connecting end;*

*a spring inserted into the body, wherein the spring comprises engagement tangs extending into the body capable of engaging a conduit, and at least two spring tangs capable of engaging an opening in a junction box; and wherein the body is configured to receive the spring; and*

*an antishort bush located at the connecting end of the body.*

*22. The conduit connector of claim 21, wherein the spring has a rectangular shape that is complementary to the rectangular body shape.*

*23. The conduit connector of claim 21, wherein the antishort bush extends into the spring, between the spring tangs.*

*24. The conduit connector of claim 21, wherein the spring tangs are capable of removably engaging the opening in the junction box.*

*25. A method of securing a conduit to a junction box, comprising:*

*disposing a conduit into a conduit connector and engaging the conduit with engagement tangs that extend into the conduit connector, wherein the conduit connector comprises*

*a hollow body having a rectangular body shape, wherein the conduit extends into the body;*

*a spring disposed within the hollow body and comprising the engagement tangs and spring tangs extending out of the hollow body; and*

*an antishort bush, wherein the antishort bush extends through the opening in the junction box;*

*inserting a connecting end of the conduit connector into an opening in a junction box such that the spring tangs engage the opening.*

* * * * *